(12) United States Patent
Masse et al.

(10) Patent No.: US 9,598,178 B2
(45) Date of Patent: Mar. 21, 2017

(54) METHOD FOR MONITORING A DEGRADATION IN AN ON-BOARD DEVICE OF AN AIRCRAFT WITH AUTOMATIC DETERMINATION OF A DECISION THRESHOLD

(71) Applicants: SNECMA, Paris (FR); SAFRAN ENGINEERING SERVICES, Blagnac (FR); UNIVERSITE DE TECHNOLOGIE DE TROYES, Troyes (FR)

(72) Inventors: Jean-Remi Andre Masse, Saint-Cloud (FR); Ouadie Hmad, Montereau Fault Yonne (FR); Edith Grall-Maes, Saint-Pounage (FR); Pierre Jean Emile Beauseroy, Troyes (FR)

(73) Assignees: SNECMA, Paris (FR); SAFRAN ENGINEERING SERVICES, Blagnac (FR); UNIVERSITE DE TECHNOLOGIE DE TROYES, Troyes (FR)

( * ) Notice: Subject to any disclaimer, the term of this patent is extended or adjusted under 35 U.S.C. 154(b) by 287 days.

(21) Appl. No.: 14/478,076

(22) Filed: Sep. 5, 2014

(65) Prior Publication Data
US 2015/0073650 A1   Mar. 12, 2015

(30) Foreign Application Priority Data

Sep. 6, 2013 (FR) ..................... 13 58593

(51) Int. Cl.
*B64D 45/00* (2006.01)
*G05B 23/02* (2006.01)

(52) U.S. Cl.
CPC .......... *B64D 45/00* (2013.01); *G05B 23/024* (2013.01); *B64D 2045/0085* (2013.01)

(58) Field of Classification Search
CPC ............ B64D 2045/0085; B64D 45/00; G05B 23/0235; G07C 5/0808
See application file for complete search history.

(56) References Cited

U.S. PATENT DOCUMENTS

| | | | | |
|---|---|---|---|---|
| 5,455,777 A | * | 10/1995 | Fujiyama | G07C 3/00 702/34 |
| 6,880,967 B2 | * | 4/2005 | Isozumi | G01K 3/04 324/548 |

(Continued)

FOREIGN PATENT DOCUMENTS

FR  2 983 528 A1  6/2013

OTHER PUBLICATIONS

French Preliminary Search Report issued May 14, 2014 in French Application 13 58593, filed on Sep. 6, 2013 ( with English translation of categories of Cited Documents).

*Primary Examiner* — Mussa A Shaawat
(74) *Attorney, Agent, or Firm* — Oblon, McClelland, Maier & Neustadt, L.L.P.

(57) ABSTRACT

A method for monitoring a degradation in an on-board device of an aircraft, comprising a step of comparing an abnormality score obtained for a given flight of said aircraft with a decision threshold (S) and a step of transmitting an alert in the event of said decision threshold (S) being exceeded, said decision threshold (S) being automatically determined for a given probability of alert Pa, corresponding to the probability of an alert being transmitted during the monitoring method when said on-board device is healthy, by means of a plurality of steps, including a step of reading the antecedent of the continuous adjusted division function for the value 1−Peac, said antecedent corresponding to said decision threshold (S), with Peac being the elementary probability of exceeding the threshold for confirmation per (Continued)

k exceedances of threshold during n consecutive flights and being a function of the probability of alert Pa.

8 Claims, 5 Drawing Sheets

(56) References Cited

U.S. PATENT DOCUMENTS

| | | | |
|---|---|---|---|
| 6,892,163 B1* | 5/2005 | Herzog | G05B 23/0254 700/30 |
| 9,014,918 B2* | 4/2015 | Hagen | G07C 5/006 701/117 |
| 2005/0143873 A1* | 6/2005 | Wilson | G05B 23/0254 701/8 |
| 2008/0004840 A1* | 1/2008 | Pattipatti | G05B 23/0243 702/183 |
| 2008/0312783 A1* | 12/2008 | Mansouri | G07C 5/0808 701/31.4 |
| 2009/0100293 A1 | 4/2009 | LaComb et al. | |
| 2010/0030519 A1* | 2/2010 | Collier | F41G 7/007 702/181 |
| 2011/0265026 A1* | 10/2011 | Tarassenko | A61B 5/02055 715/771 |
| 2012/0296500 A1* | 11/2012 | Yamasaki | G01M 9/06 701/14 |
| 2013/0024172 A1 | 1/2013 | Suyama et al. | |
| 2013/0179097 A1 | 7/2013 | Masse et al. | |
| 2013/0197725 A1* | 8/2013 | O'Dell | B64F 5/0045 701/14 |
| 2013/0197739 A1* | 8/2013 | Gallagher | B64F 5/0045 701/31.5 |
| 2013/0274992 A1* | 10/2013 | Cheriere | B64F 5/0081 701/32.9 |
| 2013/0325219 A1* | 12/2013 | Pitard | G07C 5/0825 701/14 |
| 2014/0257716 A1* | 9/2014 | Lajnef | G01N 19/00 702/34 |
| 2016/0196698 A1* | 7/2016 | O'Dell | G07C 5/085 701/33.4 |

* cited by examiner

METHOD FOR MONITORING A DEGRADATION IN AN ON-BOARD DEVICE OF AN AIRCRAFT WITH AUTOMATIC DETERMINATION OF A DECISION THRESHOLD

GENERAL TECHNICAL FIELD AND PRIOR ART

The present invention relates to the field of monitoring a degradation in an on-board device of an aircraft such as, for example, a turbojet engine lubrication system, a metering unit for the fuel supply of a turbojet engine, a redundant acquisition chain of a turbojet engine, a particle filter, etc.

In order to monitor an on-board device, the formation of an indicator characteristic of a degradation in the on-board device is known. This indicator is known as an abnormality score to a person skilled in the art. Conventionally, an abnormality score is formed on the basis of measurements of physical parameters of the on-board device such as, for example, a geometric position, a control current, an angle of opening, a temperature, etc. The abnormality score is characteristic of the degree of damage of the degradation. Preferably, an abnormality score is formed during each flight of the aircraft.

By way of example, according to the SNECMA patent application filed in France on 5 Dec. 2011 under number 1161175, a method is known for monitoring a fuel metering unit of a turbojet engine in which the degradation relating to the drift of the quiescent current of a servovalve controlling the fuel metering unit is monitored. In order to form the abnormality score characteristic of the drift of the quiescent current of the servovalve, a plurality of measurements is taken of the average control current and the norm is taken therefrom.

In order to determine whether the on-board device is actually degraded, the monitoring method comprises a step of comparing an abnormality score obtained for a given flight of the aircraft with a decision threshold and a step of transmitting an alert in the event of the decision threshold being exceeded. Thus, by monitoring the evolution of the abnormality score, it is possible to detect if the degree of degradation increases and the risk of breakdown of the on-board device can be anticipated, and the management of maintenance operations can be improved.

Setting the decision threshold for a given degradation is crucial given that, on the one hand, an excessively low decision threshold causes the transmission of frequent alerts when the degradation has not occurred (false alert) and, on the other hand, an excessively high decision threshold prevents the transmission of alerts when the degradation has occurred (non-detection).

Conventionally, for each degradation to be detected, the value of the decision threshold is empirically defined. In order to provide maximum safety, the value of the decision thresholds is generally underestimated so as to minimise the risk of non-detection. The result is that the number of false alerts remains high, which is a disadvantage for airlines, which are forced to frequently implement a maintenance operation when the on-board aeronautic device is not degraded. In order to overcome this disadvantage, the airlines stipulate stringent specifications for manufacturers of on-board devices so as to limit the risk of error. Thus, given the precision that is required, any empirical definition of a decision threshold for a method for monitoring breakdowns is prohibited.

Therefore, there is a requirement for reliably and precisely determining the value of a decision threshold for monitoring a degradation in an on-board device of an aircraft.

The patent application FR 1254506 provides a solution to this requirement and discloses a method for monitoring a degradation in an on-board device of an aircraft, implemented by a computer, with the degree of the degradation of the on-board device being defined by an abnormality score formed on the basis of measurements of physical parameters of the on-board device, the monitoring method comprising a step of comparing an abnormality score obtained for a given flight of the aircraft with a decision threshold and a step of transmitting an alert in the event of the decision threshold being exceeded, with the decision threshold being automatically determined for a given probability of alert Pa, corresponding to the probability of an alert being transmitted during the monitoring method when the on-board device is healthy, by means of the following steps:

a step of computing a plurality of abnormality scores for a plurality of flights of the aircraft without degradation so as to obtain a distribution of the probability density of the abnormality score, with the distribution being specific to the physical nature of the on-board device;

a step of adjusting the distribution using a non-parametric estimator of the probability density so as to obtain a continuous adjusted distribution function;

a step of computing a continuous adjusted division function on the basis of the continuous adjusted distribution function; and a step of reading the antecedent of the continuous adjusted division function for a given value (1−Pa in the prior application), with the antecedent corresponding to the decision threshold.

This method allows the decision threshold to be automatically determined with a high degree of accuracy as a function of the probability of alert Pa corresponding to the requirements of airlines. Such a method is reliable compared to the methods of the prior art, allowing any degradation of an on-board device to be precisely detected and any breakdown of said device to be anticipated when monitoring.

However, it has been noted that for at most several hundred observed learning scores, the antecedent of the adjusted division function for the value 1−Pa is clearly outside of these learning scores. This extrapolation effect can be detrimental to the accuracy of the decision threshold.

The invention proposes a simple and efficient solution to this problem.

GENERAL PRESENTATION OF THE INVENTION

To this end, the invention proposes a method for monitoring a degradation in an on-board device of an aircraft as described above, which is noteworthy in that the step of reading the antecedent of the continuous adjusted division function is realised for the value 1−Peac, with Peac being the elementary probability of exceeding the threshold for confirmation per k exceedances of the threshold during n consecutive flights and being obtained by the following formula:

$$\text{Peac} = B^{-1}_{(k, n-k+1)}(Pa)$$

wherein $B^{-1}_{(k,n-k+1)}$ is an inverse Beta division function of parameters k and n−k+1 and Pa is the aforementioned probability of alert.

The proposed technical solution is based on the use of a "k among n" confirmation strategy. With this strategy, the alert is only transmitted if there are at least k exceedances of threshold during n consecutive flights. By way of compensation, the detection threshold is located further within the range of the observed learning scores. This interpolation effect is more beneficial to the precision of the decision threshold than in the prior application.

In a preferred manner, the non-parametric estimator of the probability density is a Parzen window estimator. Such an estimator is highly advantageous as it grants the same significance to the central part of the distribution as to the end parts, which are the most critical for monitoring degradation in the aeronautics field, for which the reliability requirements are high.

Preferably, a Parzen window estimator is defined by its window width h. In a preferred manner, with the distribution being formed on the basis of a number N of abnormality scores for a plurality of flights of the aircraft without degradation, the distribution being an estimated standard deviation $\hat{\sigma}$, the width h of the Parzen window is defined according to the following formula:

$$h = \hat{\sigma}\left(\frac{4}{3*N}\right)^{1/5}$$

Such a Parzen window width h guarantees the precision of the adjustment for monitoring on-board devices, which guarantees the precision of the determined decision threshold.

According to a preferred aspect of the invention, the probability of alert Pa is obtained by the following formula:

$$Pa = \frac{Pe}{(1-Pe)} \cdot (1-\beta)_{a\ priori} \cdot \frac{Pd}{(1-Pd)}$$

wherein:
Pe corresponds to the probability of the on-board device being healthy when an alert is transmitted;
Pd corresponds to the probability of a degradation for a given flight; and
$(1-\beta)_{a\ priori}$ corresponds to the probability of detecting an a priori degradation.

Advantageously, the probability of alert Pa is determined as a function of a probability of error Pe that corresponds to the practical requirements of the airlines, which seek to reduce the number of unnecessary maintenance steps of on-board devices.

More preferably, the method comprises:
a step of implementing the method for monitoring a degradation of the on-board device, with the previously determined decision threshold, for a plurality of abnormality scores formed for a plurality of flights of the aircraft with degradation so as to deduce a probability of detecting an a posteriori degradation $(1-\beta)_{a\ posteriori}$;
a step of determining a new probability of alert Pa as a function of the probability of detecting an a posteriori degradation $(1-\beta)_{a\ posteriori}$;
a step of determining the elementary probability of exceeding the threshold Peac on the basis of the new probability of alert Pa; and
a step of determining a new decision threshold that is refined on the basis of the new elementary probability of exceeding the threshold Peac.

These steps advantageously allow the value of the decision threshold to be quickly and reliably refined.

The method according to the invention can comprise a step of predetermining values of k and n. The higher these values, the further the detection threshold for confirmation per k exceedances among n flights will be within the range of the observed scores. However, the phenomenon of degradation before breakdown must be even slower in order to be detected in time. The selection of n therefore can be based on operational considerations of the removal time and of the dynamics of physical degradation up to breakdown.

Advantageously, the value of n is selected before that of k. The value of k is preferably selected as a function of that of n, particularly so as to maximise the detection probability. In a particular embodiment of the invention, for n=10, k equals 8 or 9.

PRESENTATION OF THE DRAWINGS

The invention will be better understood upon reading the following description, which is provided solely by way of example, and with reference to the accompanying drawings, wherein.

Figure 1:
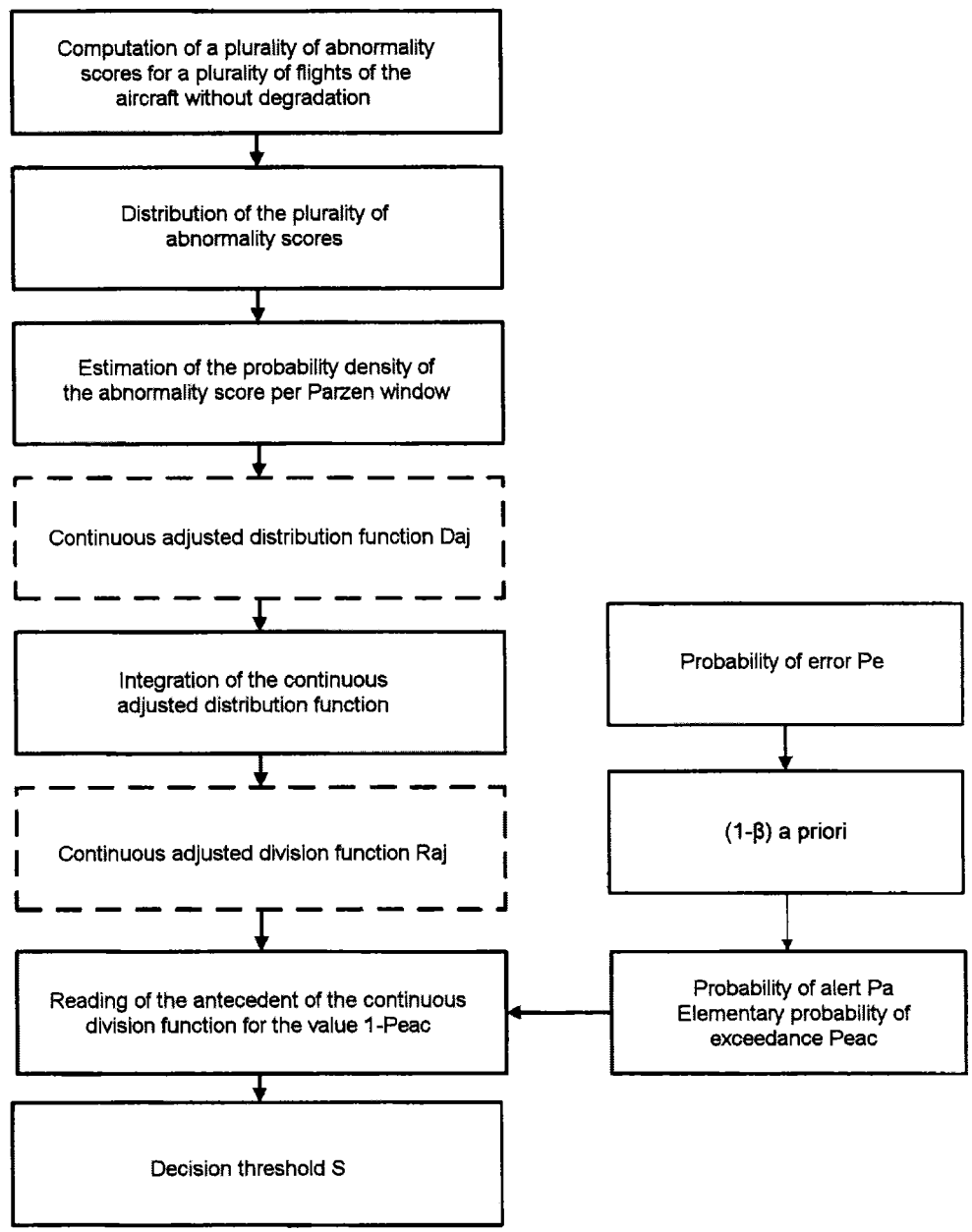
FIG. 1 is a schematic diagram of the steps of automatically determining the decision threshold according to the invention.

It is to be noted that the figures illustrate the invention in detail so as to enable it to be implemented, but they can of course also be used to obtain a better definition of the invention, where necessary.

DESCRIPTION OF ONE OR MORE EMBODIMENTS AND IMPLEMENTATIONS

The automatic determination of a decision threshold will be described for a method for monitoring a degradation in an on-board device of an aircraft as known in the prior art, for example, according to the SNECMA patent application filed under number 1161175.

In a known manner, the degree of degradation of the on-board device is defined by an abnormality score obtained by computation using measurements of physical parameters of the on-board device, as previously described. Preferably, the abnormality score is formed by a computer that is on board the aircraft and is connected to the on-board device by a communication link. In a known manner, as previously shown, the monitoring method comprises a step of comparing an abnormality score obtained for a given flight of the aircraft with a decision threshold and a step of transmitting an alert in the event of the decision threshold being exceeded.

When transmitting an alert, a step of maintaining the on-board device has to be implemented by the airline in order to prevent a breakdown in said on-board device.

Probability of Alert

The automatic setting of a decision threshold is defined in the prior art for a given probability of alert Pa. The term probability of alert is understood to mean the probability of an alert being transmitted during the method when the on-board device is healthy, i.e. without degradation occurring. In other words, a probability of alert Pa of 1% corresponds to the transmission of one alert for 100 flights without degradation.

In practice, the probability of alert Pa is not directly known. In effect, airline specifications stipulate a probability of error Pe as a criterion, which corresponds to the probability of the on-board device being healthy when an alert is transmitted. In other words, a probability of error Pe of 1% corresponds to a healthy on-board device for 100 transmitted alerts.

In practice, when an alert is transmitted by the monitoring method, a maintenance operation is implemented by the airline. A limitation of the probability of error Pe therefore allows the airlines to limit the number of maintenance operations for an on-board device that is healthy, with such operations generating unnecessary operating costs.

In a preferred manner, the probability of alert Pa is determined as a function of the probability of error Pe using the following conditional probability formula (F1):

$$\mathrm{Pa} = \frac{Pe}{(1-Pe)} \cdot (1-\beta)_{a\ priori} \cdot \frac{Pd}{(1-Pd)} \qquad (F1)$$

The formula (F1) comprises the following parameters:
$\beta$ corresponds to the probability of non-detection of a degradation for a given flight, with $1-\beta$ then corresponding to the probability of detecting a degradation; and
Pd corresponds to the probability of a degradation for a given flight.

The formula (F1) is deduced from equations of conditional probability, in which the probability Pa corresponds to an alert knowing the healthy device (Pa=P(Alert|Healthy)) and the probability Pe corresponds to a healthy device knowing that an alert is transmitted (Pe=P(Healthy|Alert)).

$$P(\text{Healthy}|\text{Alert}) = \frac{P(\text{Healthy}) \cap P(\text{Alert})}{P(\text{Alert})}$$

$$= \frac{P(\text{Alert} \cap \text{Healthy})}{P(\text{Alert})}$$

$$= \frac{P(\text{Alert} \cap \text{Healthy})}{P(\text{Healthy})} \cdot \frac{P(\text{Healthy})}{P(\text{Alert})}$$

$$= P(\text{Alert}|\text{Healthy}) \cdot \frac{P(\text{Healthy})}{P(\text{Alert})}$$

$$= \mathrm{Pa} \cdot \frac{P(\text{Healthy})}{P(\text{Alert})}$$

In other words:

$$P(\text{Alert}) = \mathrm{Pa} \cdot \frac{P(\text{Healthy})}{P(\text{Healthy}|\text{Alert})} = \mathrm{Pa} \cdot \frac{(1-Pd)}{Pe}$$

Furthermore, as:

$P(\text{Alert})=P(\text{Alert} \cap \text{Healthy})+P(\text{Alert} \cap \text{Degraded})$ $P(\text{Alert})=P(\text{Alert}|\text{Healthy}) \cdot P(\text{Healthy})+P(\text{Alert}|\text{Degraded}) \cdot P(\text{Degraded})$ With:

$P(\text{Degraded})=Pd$ $P(\text{Healthy})=1-Pd$ $P(\text{Alert}|\text{Degraded})=1-\beta$ $P(\text{Alert}|\text{Healthy})=Pa$ $P(\text{Healthy}|\text{Alert})=Pe$ $P(\text{Alert})=P(\text{Alert}|\text{Healthy}) \cdot P(\text{Healthy})+P(\text{Alert}|\text{Degraded}) \cdot P(\text{Degraded})$ $P(\text{Alert})=Pa \cdot (1-Pd)+(1-\beta) \cdot Pd$ $P(\text{Alert})=Pa \cdot (1-Pd)+(1-\beta) \cdot Pd$ By virtue of two equalities relating to P(Alert), (F1) then can be deduced.

In the formula (F1), the probability of a degradation for a given flight Pd is known by experimentation or by estimation and can be of the order of $10^{-7}$, for example. The probability of detecting a degradation $(1-\beta)_{a\ priori}$ is "a priori" set to 1 and is refined by iteration, as will be described hereafter, in order to improve the precision of the decision threshold.

By way of example, a probability of alert Pa of the order of $5 \times 10E-8$ is conventionally obtained for a stipulated probability of error Pe of the order of 5%, a probability of detecting a degradation $(1-\beta)_{a\ priori}$ of the order of 1 and a probability of a degradation for a flight Pd of the order of $10^{-6}$.

Abnormality Score, Distribution and Division Function

The device on board the aircraft conventionally comprises a plurality of sensors for measuring physical parameters of the on-board device (control current, geometric positions, temperatures, etc.). Conventionally, certain measured physical parameters are used to form an abnormality score that depends on the degree of degradation of the on-board device (positioning error, drift of the control current, overheating, etc.). An abnormality score is obtained by the transformation of one or more measurements of physical parameters of the on-board device. For example, the measurements that are obtained are normalised by absolute value or by the Mahalanobis norm.

As shown in FIG. 1, the method according to the invention comprises a step of computing a plurality of abnormality scores for a plurality of flights of the aircraft without degradation. With regard to aircraft flights during which the on-board device is healthy, a plurality of abnormality scores is conventionally computed on the basis of measurements of physical parameters of the on-board device carried out during each flight of the aircraft. The values of the abnormality scores vary as a function of the flights of the aircraft and of the physical nature of the on-board device.

Figure 3:
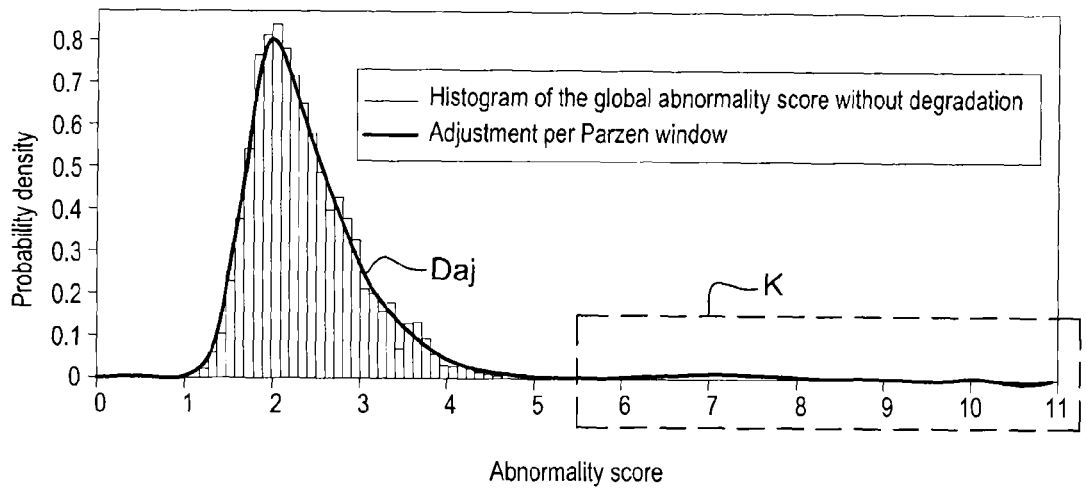
FIG. 3 represents the distribution of abnormality scores obtained for a computer on board an aircraft for a plurality of flights without degradation, with the curve representing an adjustment of the distribution obtained.

The distribution of the probability density of the abnormality score is shown in FIG. 3 by means of a histogram. As shown in this figure, an abnormality score that is equal to 2 is the most probable (probability density of 0.8). The higher the number of abnormality scores, the more precise the distribution. Unfortunately, a high number of abnormality scores requires a large number of flights of the aircraft, which is not desirable. In this example, the abnormality scores have been obtained on 200 to 500 flights.

The probability of alert Pa, which by way of reminder corresponds to the probability of an alert being transmitted during the monitoring method when the on-board device is healthy, is conventionally of the order of 5×10E−8. In other words, the decision threshold S according to the probability of alert Pa is an abnormality score value, above which there are 5×10E−8 abnormality scores obtained for flights without degradation.

Even if a very large number of abnormality scores is available, the distribution of FIG. 3 is not precise for the low value quantiles, for example, for a quantile of 5×10E−8. Using a graphical analysis, it is only possible to deduce that the value of the decision threshold S is greater than 5.5 and must be located in the window K shown in FIG. 3. In effect, the distribution is obtained by means of discrete values of abnormality scores, which limits the precision of the distribution.

Adjustment of the Distribution Function

In order to improve the interpretation of the distribution, with reference to FIG. 1, the method according to the invention comprises a step of adjusting the distribution using an estimator of the probability density, so as to obtain a continuous adjusted distribution function Daj, as shown in FIG. 3. According to the invention, a step of adjusting the distribution function using a Parzen window makes it possible to precisely approach the discreetly obtained division function.

This modern non-parametric approach allows a close adjustment to be obtained of the distribution, as an adjustment using a Parzen window advantageously adds the same weight to the queues of the distribution as to the central part, which allows the precise interpretation of the extreme quantiles.

By way of reminder, the Parzen window adjustment is a non-parametric adjustment for estimating the probability density of a random variable. It is commonly referred to as kernel density estimation, as functions referred to as "kernels" are used to estimate the probability density of a random variable. The analytical expression of the Parzen probability density is:

$$\hat{f}_h(x) = \frac{1}{N*h} \sum_{i=1}^{N} K\left(\frac{x-x_i}{h}\right)$$

With K and h being the kernel function and the width or depth of the Parzen window, respectively.

The notion of the Parzen window adjustment is to estimate the probability density of a random variable for each value of x using a kernel function K( ), which most of the time is a function of probability density. The closer the observation x is to the learning samples xi, the greater the contribution of x in the kernel function $\hat{f}_h(x)$ centred on xi. Conversely, the further the observation x is from the learning samples xi, the lower the contribution of x in the kernel function $\hat{f}_h(x)$ centred on xi. Subsequently, the estimator of the probability density function is formed by a mean of the values of the kernel functions. This estimator is governed by a smoothing parameter "h" that is referred to as window width or depth. The estimation of probability density, which depends on the smoothing parameter "h", has good statistical properties. Under certain non-restrictive conditions on "h", the Parzen window estimator is consistent.

There are several kernel functions (Gaussian, box, triangle, etc.), but the performance of the Parzen window is mainly based on the selection of the width or the depth of the window "h". A compromise between the bias and the variance of the estimator must be made in order to select the width "h".

The width of the window can be selected by cross-validation, by maximising the probability of the kernel function. In this example, a Gaussian kernel (F2) has been used. With regard to the width or the depth of the window, this is based on an estimation of the standard deviation $\hat{\sigma}$ and of the size N of the set of learning data according to the formula (F3).

$$K(x) = \frac{e^{(-0.5x^2)}}{\sqrt{2\pi}} \tag{F2}$$

$$h = \hat{\sigma}\left(\frac{4}{3*N}\right)^{1/5} \tag{F3}$$

A Parzen adjustment is very close to the elementary distribution observed for a few flights, as will be shown hereafter, which provides an optimal adjustment compared to the other known adjustments.

Contrary to the previously obtained discrete distribution, the adjusted distribution function Daj is continuous, which enables the probability density of the abnormality score to be reliably known for any abnormality score. This is highly advantageous for low value quantiles, for which there is very little gathered data.

Adjusted Division Function

In order to simply and quickly determine the decision threshold S, the adjusted distribution function Daj is conventionally integrated so as to obtain an adjusted division function Raj that is also continuous.

Figure 4:
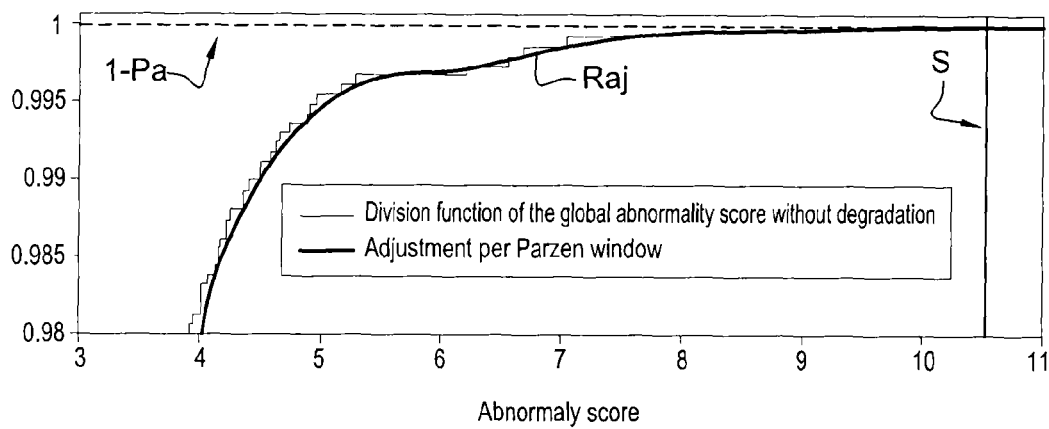
FIG. 4 represents the division function originating from the distribution of FIG. 3, with the curve representing an adjustment of the division function.

The adjusted division function Raj of the adjusted distribution function Daj of FIG. 3 is shown in FIG. 4. By way of reminder, a division function F of a real random variable X is the function Fx that associates $F_x(x)=P(X \leq x)$ with any real (variable) x. With reference to FIG. 4, the division function has a 99% value for an abnormality score of 4.5. This means that 99% of the abnormality scores for a healthy device are less than 4.5.

Furthermore, in order to comply with the probability of alert Pa criterion of the order of 5×10E−8, the antecedent of the adjusted function Raj for which this is equal to 1−Pa needs to be accurately read, with the antecedent corresponding to the desired decision threshold S. In effect, this means that 1×10E−8 of the abnormality scores for a healthy device are less than the decision threshold S. In other words, 5×10E−8 of the abnormality scores for a healthy device that can generate an alert are greater than the decision threshold S. The antecedent corresponds to the decision threshold S required for the determined probability of alert Pa.

Determining the Decision Threshold

With reference to FIG. 1, the method according to the invention comprises a step of reading the antecedent of the adjusted division function Raj for a given value. Advantageously, with the adjusted division function Raj being continuous and bijective, it is possible to precisely deduce the antecedent for which the adjusted division function Raj assumes the given value, i.e. the decision threshold S.

Figure 6:
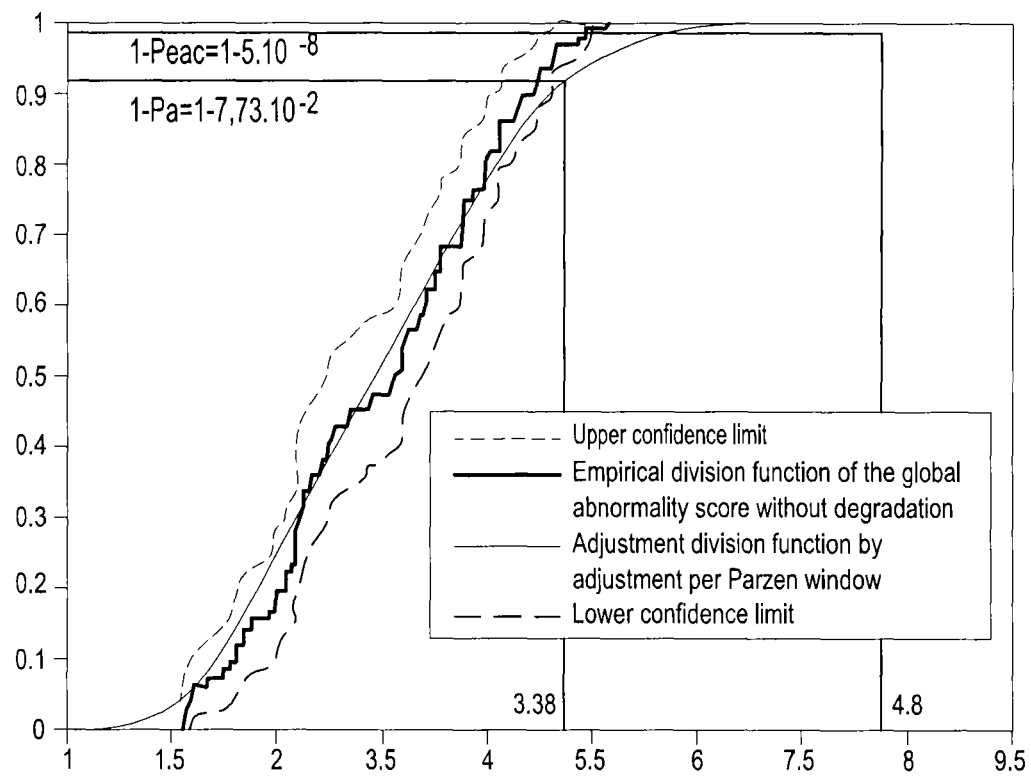
FIG. 6 represents functions of empirical and adjusted division and lower and upper confidence limits.

In the event that this given value is equal to 1−Pa, as is the case in the prior art, the result of the above formula (F1) is that, for at most several hundred learning scores, the antecedent of the adjusted division function for a value 1−Pa is clearly outside of these learning scores, as is shown in FIG. 6 (which represents the aforementioned example in which Pe is of the order of 5%, Pd is of the order of 1×10E−6 and Pa is of the order of 5×10E−8). This extrapolation effect can be detrimental to the precision of the decision threshold, which is 4.8 in FIG. 6.

The invention proposes the use of a "k among n" confirmation strategy. With this strategy, the alert is only transmitted if there are at least k exceedances of threshold during n consecutive flights. By way of compensation, the detection threshold is further within the range of the observed learning scores (FIG. 6). This interpolation effect is more beneficial to the precision of the decision threshold.

Figure 7:
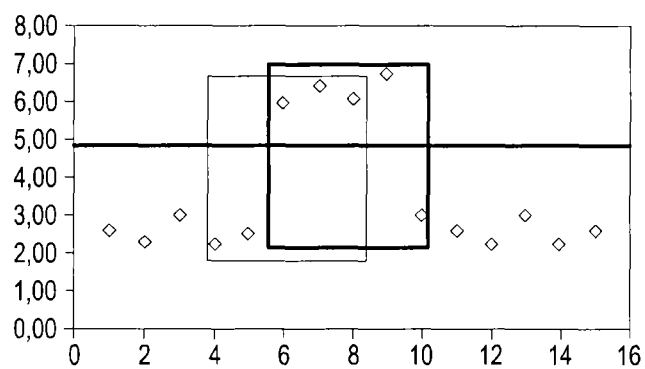
FIG. 7 is an example of the detection of k exceedances among n consecutive flights (k=4 and n=5) according to the invention.

The detection of k exceedances of threshold among n consecutive flights must notify the user of the persistence of a detection signal. This occurs by observing whether a predefined proportion (for example, k=4 and n=5, k/n=80%) of the observations is detected as being abnormal on a sliding window of size n (FIG. 7). The value of n is selected as a function of operational constraints. This function detects an anomaly if at least k observations of the global abnormality score on n are greater than the decision threshold.

The strategy according to the invention is shown in FIG. 7, which represents an example of detection for four exceedances of threshold for five consecutive flights, i.e. for k=4 and n=5. An anomaly is detected if at least 4 abnormality scores exceed the threshold in a window of size n=5. It can be seen that the window that corresponds to the first frame only comprises 3 abnormality scores above the decision threshold, which in this case is less than 5. Therefore, no anomaly is detected for this window. On the contrary, an anomaly is detected for the other window as it comprises 4 abnormality scores above the decision threshold.

For each observation, the abnormality score has an elementary probability Peac of exceeding the threshold when the system operates correctly. It can be considered that the decision variable is a random variable based on a Bernoulli distribution with the parameter Peac–Bernoulli (Peac). The distribution of n repetitions of Bernouilli experiences is a binomial distribution of the parameters n and Peac–Bernouilli(n, Peac). The probability of detecting k exceedances among the n observations is therefore provided by the binomial(n, Peac) function.

In order to estimate the performance of this strategy, the probability of alert Pa that responds to the requirements of the airlines needs to be determined. This is realised by virtue of the aforementioned equation (F1). The parameter Peac of the binomial(n, Peac) function under $H_0$ is subsequently determined as being the probability that there are at least k exceedances of the threshold among n observations with a level of confidence 1−Peac lower than Pa. In order to achieve this, the polynomial of degree k of the binomial distribution function must be resolved, such that $P(Binomial_{(n,Peac)} \geq k) \leq Pa$. However, as $P(Binomial_{(n,Peac)} \geq k) = Beta_{(k,n-k+1)}$ (Peac), Peac can be estimated using the following formula (F4):

$$Peac = B^{-1}_{(k,n-k+1)}(Pa)$$

in which n is the size of the observation window and k is the minimum number of observations detected in order to confirm the persistence of a detection signal.

The elementary detection threshold for an alert per k exceedances among n is reduced to the antecedent of the division function for the value 1−Peac, where Peac is the elementary probability of exceedance for confirmation per k exceedances among n, and is obtained by the formula (F4).

In the aforementioned case where Pa=5×10⁻⁸, n=10 and k=8, then Peac=7.73×10⁻². The antecedent of the adjusted division function for the value 1−7.73×10⁻² is further within the range of the observed scores, as can be seen in FIG. 6 where the decision threshold is equal to 3.38.

Determining Values of k and n

Figure 8:
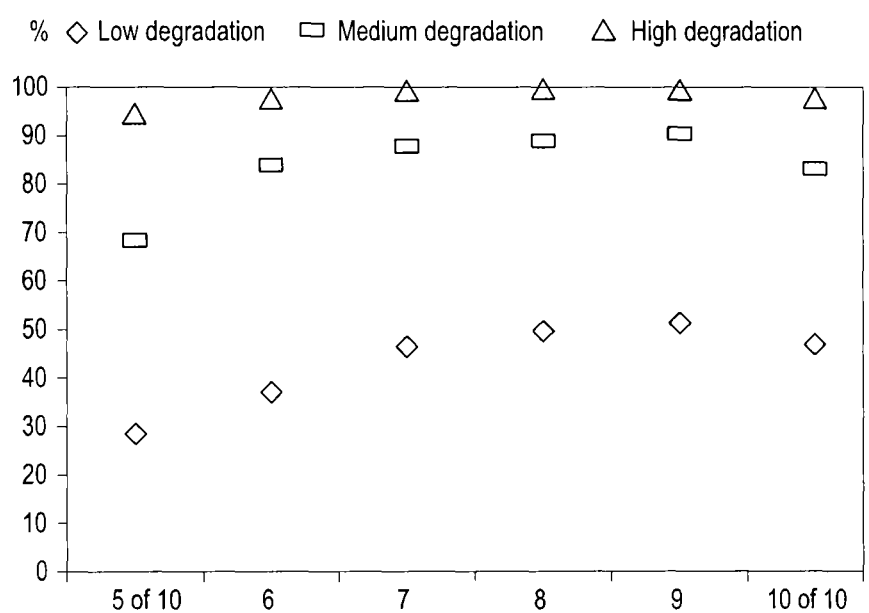
FIG. 8 represents the detection probabilities observed by simulating low, medium and high intensity degradations, respectively.

The implementation of the method assumes the prior selection of k and n. The higher their values, the further the detection threshold for confirmation per k exceedances among n will be within the range of the observed scores. However, the phenomenon of degradation before breakdown must be even slower in order to be detected in time. The selection of n is therefore based on operational considerations of the removal time and the physical degradation dynamics up to breakdown. Once n is selected, k in turn can be selected in order to maximise the probability of detection. FIG. 8 shows the observed probabilities of detection (%) by the simulation of low (start of degradation), medium and high (imminent breakdown) intensity degradations for n=10. Therefore, the influence of k can be seen on the probability of detection. The optimum is located between 8 of 10 and 9 of 10.

Refining the Value of the Decision Threshold

Figure 5:
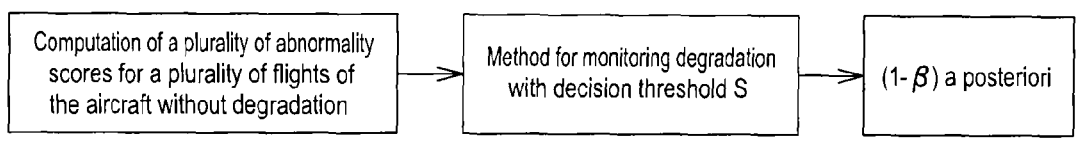
FIG. 5 is a schematic diagram of the step of refining the value of the decision threshold.

The determination of the decision threshold has previously been shown in which the probability of alert Pa is known or estimated on the basis of the probability of error Pe. When the probability of alert Pa is estimated, a step can be optionally implemented of refining the decision threshold S by refining the probability of detecting a degradation (1−β), as shown on the schematic diagrams of FIGS. 2 and 5.

Figure 2:
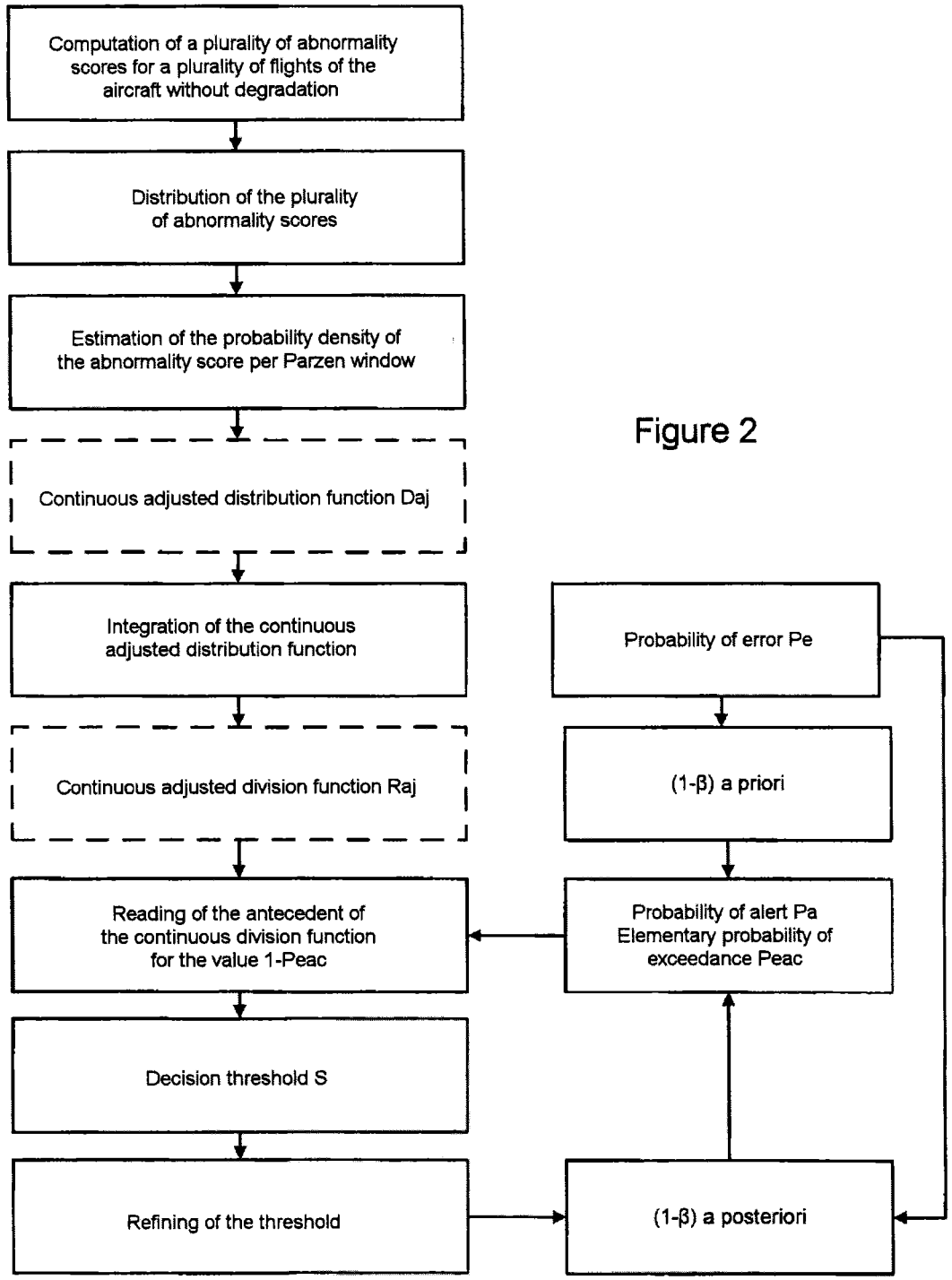
FIG. 2 is a schematic diagram of the steps of automatically determining the decision threshold according to the invention, with a step of refining the decision threshold.

As shown in FIG. 2, the monitoring method is implemented with the decision threshold S as previously determined for a plurality of abnormality scores obtained during flights with degradation, preferably obtained by simulation. During the monitoring method, the various abnormality scores are compared with the decision threshold S, which enables the "a posteriori" deduction of the probability of detecting a degradation (1−β). In effect, it is sufficient to observe the number of alerts transmitted relative to the number of flights with monitored degradation.

As shown in FIG. 2, by iteration, the value $(1-\beta)_{a\ priori}$ is replaced by the value $(1-\beta)_{a\ posteriori}$ in the steps of determining the decision threshold, with the value $(1-\beta)_{a\ posteriori}$ being obtained during the refining, so as to obtain a new and more precise value of the decision threshold S. The refining step can be iterated in order to converge toward the most precise decision threshold S value.

In one embodiment of the invention, the method for monitoring a degradation in an on-board device of an aircraft, the procedure for automatically determining a decision threshold and the method for generating degradations are implemented by a computer, and preferably by a plurality of processors of the computer.

By way of example, the monitoring method is implemented to monitor a fuel metering unit of an aircraft turbojet engine.

The processor for determining the decision threshold receives a plurality of abnormality scores without degradation from the monitoring processor and determines the decision threshold S, for a given probability of error Pe and an "a priori" probability of the monitoring method detecting a degradation. Once the decision threshold S is determined, it is transmitted to the monitoring processor, which can then compare the computed abnormality scores with said decision threshold S in order to monitor the evolution of the degradation of the fuel metering unit during flights of the aircraft.

In order to refine the value of the decision threshold S, the processor for generating degradations simulates degraded flight data, which data is sent to the monitoring processor, which transmits a certain number of alerts as a function of the received data, which allows the "a posteriori" deduction of the probability of the monitoring method detecting a degradation. This value is then sent to the processor for determining the decision threshold S, which processor provides a new decision threshold S value for the new detection probability that is obtained.

The process is repeated until a convergence of the value of the decision threshold S is obtained. In practice, a satisfactory convergence is obtained from two iterations.

The invention has been described for a fuel metering unit, but it is applicable to any device on board an aircraft.

The invention claimed is:

1. A method for monitoring a degradation in an on-board device of an aircraft, implemented by a computer, the method comprising:
measuring physical parameters from a plurality of sensors on the on-board device of the aircraft;
transforming, using the computer, the measured physical parameters to obtain an abnormality score for a given flight of the aircraft;
comparing the abnormality score obtained for the given flight of the aircraft to a decision threshold; and
transmitting an alert when the decision threshold is exceeded,
wherein the decision threshold is automatically determined for a given probability of alert Pa, corresponding to a probability of an alert being transmitted during the monitoring method when the on-board device is undamaged, by:
computing a plurality of abnormality scores for a plurality of flights of the aircraft without degradation;
obtaining a distribution of a probability density of the plurality of abnormality scores, with the distribution being specific to a physical nature of the on-board device;
obtaining a continuous adjusted distribution function by adjusting the distribution using a non-parametric estimator of the probability density;
computing a continuous adjusted division function based on the continuous adjusted distribution function; and
determining the decision threshold by reading an antecedent of the continuous adjusted division function for a given value, the antecedent corresponding to the decision threshold,
wherein the given value is 1−Peac, where Peac is an elementary probability of exceeding the decision threshold for confirmation per k exceedances of the decision threshold during n consecutive flights and is obtained by the following formula:

$$Peac = B^{-1}_{(k,\ n-k+1)}(Pa)$$

wherein $B^{-1}_{(k,\ n-k+1)}$ is an inverse Beta division function of parameters k and n−k+1 and Pa is the probability of alert.

2. The method for monitoring according to claim 1, wherein the non-parametric estimator of the probability density is a Parzen window estimator.

3. The method for monitoring according to claim 2, wherein the distribution is formed from a number N of abnormality scores for the plurality of flights of the aircraft without degradation, the distribution having an estimated standard deviation ($\hat{\sigma}$), and a width h of the Parzen window is defined according to the following formula:

$$h = \hat{\sigma}\left(\frac{4}{3*N}\right)^{1/5}$$

4. The method for monitoring according to claim 1, wherein the probability of alert Pa is obtained by the following formula:

$$Pa = \frac{Pe}{(1-Pe)} \cdot (1-\beta)_{a\ priori} \cdot \frac{Pd}{(1-Pd)}$$

wherein:
Pe corresponds to the probability of the on-board device being undamaged when the alert is transmitted;
Pd corresponds to the probability of the degradation for the given flight; and
$(1\beta)_{a\ priori}$ corresponds to the probability of detecting an a priori degradation.

5. The method for monitoring according to claim 4, further comprising:
deducing the probability of detecting the a posteriori degradation $(1\beta)_{a\ posteriori}$ by implementing the method for monitoring the degradation in the on-board device with the previously determined decision threshold for the plurality of abnormality scores formed for the plurality of flights of the aircraft with degradation $(1\beta)_{a\ posteriori}$;
determining a new probability of alert Pa as a function of the probability of detecting the a posteriori degradation $(1\beta)_{a\ posteriori}$;
determining the elementary probability of exceeding the threshold Peac based on the new probability of alert Pa; and
determining a new decision threshold that is refined based on the new elementary probability of exceeding the threshold Peac.

6. The method for monitoring according to claim 1, further comprising:
predetermining values of k and n.

7. The method for monitoring according to claim 6, wherein the value of n is selected before that of k and the value of k is selected as a function of that of n.

8. The method for monitoring according to claim 7, wherein the value of n is selected in order to maximise the detection probability.

* * * * *

UNITED STATES PATENT AND TRADEMARK OFFICE
CERTIFICATE OF CORRECTION

PATENT NO. : 9,598,178 B2
APPLICATION NO. : 14/478076
DATED : March 21, 2017
INVENTOR(S) : Jean-Remi Andre Masse et al.

It is certified that error appears in the above-identified patent and that said Letters Patent is hereby corrected as shown below:

On the Title Page

Item (72), the third inventor's city is incorrect. Item (72) should read:
--(72) Inventors: Jean-Remi Andre Masse, Saint-Cloud (FR); Ouadie Hmad, Montereau Fault Yonne (FR); Edith Grall-Maes, Saint-Pouange (FR); Pierre Jean Emile Beauseroy, Troyes (FR)--

In the Claims

Column 12, Line 7, cancel the text beginning with "3. The method for" to and ending " $h = \hat{\sigma}\left(\frac{4}{3*N}\right)^{1/5}$ " in Column 12, Line 16, and insert the following claim:
--3. The method for monitoring according to claim 2, wherein the distribution is formed from a number N of abnormality scores for the plurality of flights of the aircraft without degradation, the distribution having an estimated standard deviation $\hat{\sigma}$, and a width h of the Parzen window is defined according to the following formula:

$$h = \hat{\sigma}\left(\frac{4}{3*N}\right)^{1/5}$$
--

Signed and Sealed this
Twenty-fourth Day of April, 2018

Andrei Iancu
*Director of the United States Patent and Trademark Office*